INVENTORS
James T. Zellers, Jr.,
Alfred E. Badger
and Glen J. Lehr
BY Nobbe & Swope
ATTORNEYS

United States Patent Office 2,975,555
Patented Mar. 21, 1961

2,975,555

TREATMENT OF GLASS BATCH

James T. Zellers, Jr., Charleston, W. Va., and Alfred E. Badger, Maumee, and Glen J. Lehr, Toledo, Ohio, assignors to Libbey-Owens-Ford Glass Company, Toledo, Ohio, a corporation of Ohio Filed Oct. 6, 1958, Ser. No. 765,506

4 Claims. (Cl. 49—77)

This invention relates broadly to the charging of batch into a glass melting tank and more particularly to an improved method of decreasing the batch dust carry-over into the checkers of a regenerative or recuperative type of glass melting furnace.

In the past, when the batch materials were introduced into the melting chamber, portions of the batch materials were removed from the surface of the batch and carried into the gas and flame streams which are played over the batch or charge. As the products of combustion are carried away from the furnace melting chamber, the batch materials which leave the batch are carried out of the furnace by the force of the moving gases. This batch dust gradually clogs the checkers of the regenerators, resulting in loss of furnace draft and necessitating frequent cleaning of the checkers which causes a loss in production.

Broadly stated, the present invention involves the establishment of a crust or coating on the surface of the batch blanket to reduce the carry-over of batch dust to the regenerators and which provides a more steady furnace operation and contributes to an improvement in the quality of the glass.

It is therefore a primary object of the present invention to provide a method of blanketing the batch before it enters the furnace, in a manner to effectively decrease the batch dust introduced into the regenerators of the furnace.

It is a further object of the present invention to provide a method for establishing a uniform crust on the blanket of batch before the same enters into the melting furnace in order to achieve a more steady furnace operation.

Other objects and advantages of the invention will become more apparent during the course of the following description when taken in connection with the accompanying drawings.

In the drawings, wherein like numerals are employed to designate like parts throughout the same:

Generally speaking by our invention we propose to impregnate the top of the batch to a depth of about ½ inch with water or, preferably, with a material which will have a tendency to melt and react with the batch before the batch enters the furnace and thus form an overlying glassy crust on the top of the batch. This crust will act as a barrier to the loss of batch dust which is normally carried over into the checkers by the fires in the melting furnace. Such a hard crust may be formed by the placement of water or sodium silicate solution uniformly across the upper surface of the batch, however, other low melting alkaline compounds such as sodium nitrate may be used.

Figure 1:
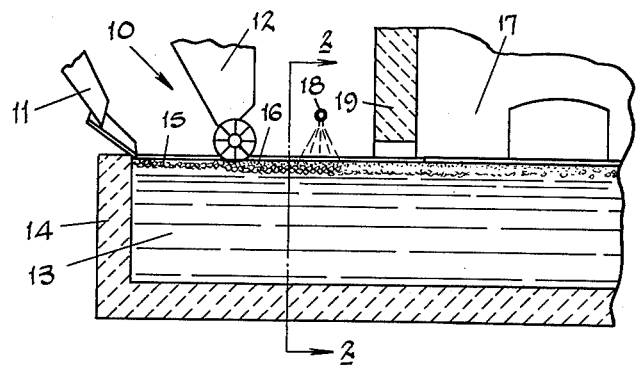
Fig. 1 is a side elevation view partly in section of the charging end of a typical glass melting tank furnace showing batch feeding apparatus and the batch blanketing apparatus according to the present invention.

Referring now to Fig. 1, there is shown the charging end 10 of a typical regenerative type of glass melting tank furnace, showing the cullet feeder 11 and a blanket type of batch feeding apparatus 12 for the raw pulverulent batch materials. Since the actual detailed construction of the cullet feeder 11 and the batch feeder 12 do not form part of this invention only that portion of the aforementioned apparatus will be described which it is believed are necessary for a complete understanding of the invention.

Generally speaking the cullet feeder 11 is adapted to discharge scrap or cullet glass into the pool or body of molten glass 13 in the area adjacent the end wall 14 of the furnace 10 and in such a manner so as to create a substantially continuously uniform layer or stratum 15 thereon. As the cullet stream or stratum 15 moves forwardly there is deposited on the surface thereof a substantially continuous layer or stratum 16 of raw batch pulverulent materials from the batch feeder 12 and which is susceptible to carry-over into the regenerators by the stream of flame and gas sweeping thereacross to melt the same.

Now we have found that if water or a solution of a material having a tendency to react with the batch is sprayed over the top of the blanket 16 before it enters the furnace that this material would dry and react with the batch to form a cover or crust over the batch before it actually entered the furnace firing chamber 17 and the loss of batch material to the checkers would be decreased if not entirely eliminated.

When using water to treat the batch, it has been found that a uniform coverage of the batch will reduce the loss of batch material to the checkers. This water may be sprayed or otherwise deposited onto the batch material to impregnate the surface of the batch and the dust over the batch will be reduced markedly by this treatment. The total water consumption when spraying the water onto the batch has been found to be about 500 gallons for 24 hours.

Considering that the impregnating solution is sodium silicate as exemplary and assuming that the batch blanket 16 is 10 inches deep, a surface treatment to about ½ inch in depth by the sodium silicate solution would be sufficient. Only about 1/20 of the batch blanket 16 would therefore be treated and the effect upon the composition of the glass would be negligible. For example, the treatment of the total amount of batch with sodium silicate would change the chemical composition of the glass by about .35 percent $Na_2O$ and nearly 1 percent $SiO_2$. Such changes in the glass composition would require compensating changes in the glass batch. However, by treating only the upper ½ inch of a 10-inch thick blanket with sodium silicate, the glass composition would be changed by only about .02 percent $Na_2O$ and .07 percent $SiO_2$. Both of these increases are negligible in commercial practice and no compensation in batch composition would be necessary. The chemical composition of the sodium silicate is not critical. However, sodium silicate having a specific gravity of 47° Baumé and a nominal composition of 11% $Na_2O$ and 31.2% $SiO_2$ is satisfactory. It has been found that diluting this sodium silicate with an equal volume of water provides a solution which is satisfactory for spraying. An estimated amount of 40 gallons of sodium silicate per day is sufficient for treating the batch blanket.

Figure 2:
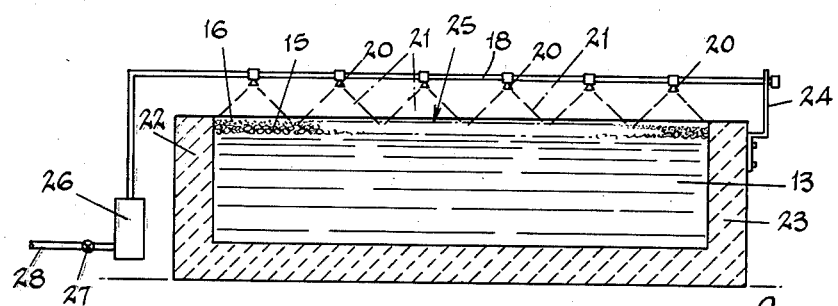
Fig. 2 is a sectional view taken along lines 2—2 of Fig. 1.

In order to cover or otherwise position a blanket of sodium silicate upon the batch blanket 16 there is shown in Figs. 1 and 2 a conduit or pipe 18 extending across the full width of the charging end 10 of the furnace. This pipe 18 is located substantially intermediate the batch feeder 12 and the entrance wall 19 of the heating chamber 17. Referring now to Fig. 2 this pipe 18 has a plurality of nozzles 20, there being six shown, which are positioned so that the spray patterns 21 from these nozzles 20 establish a uniform distribution of solution across the full width of the furnace between the side walls 22, 23. As seen in Fig. 2 this pipe is suitably mounted as by a bracket 24 so as to be maintained at a constant level above the surface 25 of batch blanket 16 and substantially parallel thereto. A suitable spacing of about 28 inches between nozzles has been found to be sufficient and a spacing of 14 to 16 inches between the nozzles and the surface 25 of the batch blanket is likewise sufficient to provide uniform coverage of a 14 foot wide batch blanket.

In this embodiment a filter screen 26 has been provided to remove any possible impurities from the solution moving through the pipe 18 which impurities might tend to clog any one of the nozzles 20. A suitable shut off valve 27 has also been provided between the pipe 18 and the lead pipe 28 which lead pipe is itself connected to a suitable source solution. Normally it has been found that a pressure of approximately 12 pounds per square inch is desirable to spray the sodium silicate solution onto the batch 16 in a uniform pattern, as hereinbefore discussed.

Figure 3:
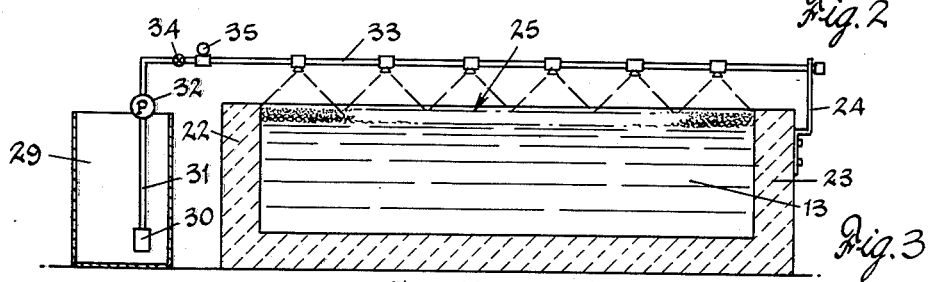
Fig. 3 is a modification of the apparatus as disclosed in Fig. 2.

Referring now to Fig. 3 there is shown a modification of the apparatus wherein a sump 29 has been provided to retain the solution to be used as the spray composition and a filter screen 30 is positioned in the sump at the end of a pipe 31. A suitable pump 32 is used to withdraw the solution from the sump 29 through the filter 30 and lead line 31 and to introduce it into the transversely extending pipe 33 similar to the pipe 18 shown in Fig. 2 and hereinabove discussed. The valve 34 controls the flow of fluid through the pipe 33 to establish the proper uniform spraying and if desired a gauge 35 may be used in order to establish the correct spraying pressure.

Figure 4:
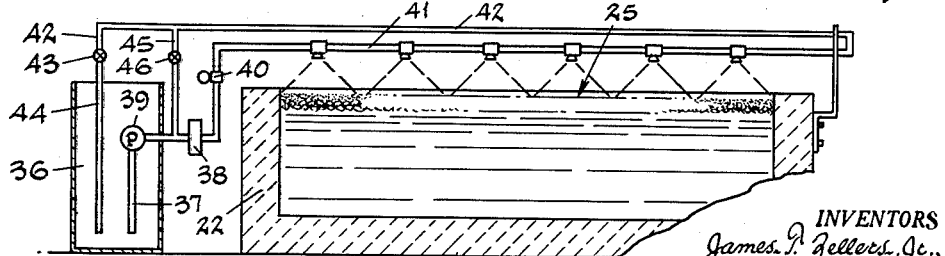
Fig. 4 is a further modification of the apparatus as shown in Fig. 2.

Referring now to Fig. 4 there is shown a further modification of the invention wherein a closed continuous recirculating system has been used. In this case the sump 36 has an exit feed line 37 through which the solution is pumped through the filter screen 38 by pump 39 past gauge 40 to the distribution pipe 41 similar to pipes 32 and 18 hereinbefore described. However, in this case the pipe 41 is suitably joined to a return pipe or conduit 42 so that the fluid may be returned back to the sump through a valve 43 and return line 44. Thus continuous circulation of the sodium silicate solution used to spray the batch blanket is possible, which prevents overheating of the solution and possible clogging of the nozzles. An intermediate bypass line 45 is also often desirable and may be opened through the medium of a valve 46.

It is to be understood that the forms of the invention disclosed herein are to be taken as the preferred embodiments thereof, and that various changes in the shape, size and arrangement of parts as well as various procedural changes may be resorted to without departing from the spirit of the invention or the scope of the following claims.

We claim:

1. In a method of charging glass batch into a glass melting furnace, the steps of forming a layer of the batch material upon a body of molten glass, impregnating the surface of said layer of batch by applying thereto a liquid solution containing a low-melting sodium compound, forming a crust upon the surface of said layer of batch by the reaction of the sodium compound with the batch, and carrying the crust along with the batch layer into the furnace to prevent the batch dust from being carried over into the regenerators of the furnace.

2. In a method as defined in claim 1, wherein the low-melting sodium compound is sodium silicate and the crust is formed of sodium silicate and the batch material.

3. In a method as defined in claim 1, said impregnating step including spraying the liquid solution over the upper surface of the layer of batch material, and continually recirculating the liquid solution through a closed system throughout the spraying process.

4. In a method as defined in claim 1, wherein the layer of glass batch has a depth of about 10 inches, and the surface of said batch layer is impregnated to a depth of not greater than ½ inch.

References Cited in the file of this patent

UNITED STATES PATENTS

| | | |
|---|---|---|
| 708,309 | Bronn | Sept. 2, 1902 |
| 1,623,057 | Kingsley | Apr. 5, 1927 |
| 2,294,373 | Batchell | Sept. 1, 1942 |
| 2,498,766 | Pettigrew | Feb. 28, 1950 |